UNITED STATES PATENT OFFICE.

OSCAR DYCKERHOFF, OF KARLSRUHE, GERMANY.

MEtALLURGICAL TREATMENT OF SILVER ORES.

1,085,675.     Specification of Letters Patent.     Patented Feb. 3, 1914.

No Drawing.     Application filed February 13, 1913. Serial No. 748,107.

*To all whom it may concern:*

Be it known that I, OSCAR DYCKERHOFF, doctor of philosophy, and a citizen of the German Empire, and resident of Karlsruhe, in the Grand Duchy of Baden, Germany, with the post-office address Westendstrasse 52, have invented new and useful Improvements in the Metallurgical Treatment of Silver Ores, of which the following is a specification.

The processes for the metallurgical treatment of complex silver ores or silver residues, which contain the silver wholly or in part in the metallic condition, in no way produce the results which are to be expected of a process that is even only to some extent satisfactory.

The usual smelting operation yields, as might be expected from the composition of the Canadian ores for example, wholly insufficient results, even when the smelting is conducted in a vacuum furnace with or without a preliminary roasting to eliminate arsenic, always a difficult operation.

For want of a suitable process it has been necessary to sell the richer portions of the ore to the large lead smelters who have used it as a direct addition to the shaft furnaces and have paid only for the silver, and even for this only with deductions.

A rational, cheap process, which permits the recovery of all the silver and at least the larger part of the cobalt, nickel and arsenic, has hitherto been wanting. A simple chloridizing roasting with addition of common salt, applicable in the case of similar ores poor in silver is a complete failure when larger proportions of metallic silver are present. It has now been found, however, that it is possible easily to chloridize the silver even when present in large proportion, if there be added to the mixture of ore and salt, before it is roasted, clay or ordinary loam. With this addition there occurs at a suitable temperature a decomposition of the salt in the sense that sodium silicate is formed and chlorin or hydrochloric acid liberated, which attacks the silver energetically while the alumina and in particular the undecomposed clay used in excess absorbs the silver chlorid and so gives the hydrogen chlorid opportunity to attack and further chloridize metallic silver. Quartz powder when used instead of clay satisfactorily decomposes the salt but does not act by any means equally well.

I. $4NaCl + 2SiO_2 + 2O = Na_4Si_2O_6 + 4Cl$. 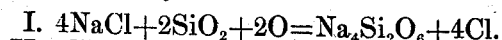
II. $4NaCl + 2SiO_2 + 2H_2O = Na_4Si_2O_6 + 4HCl$. 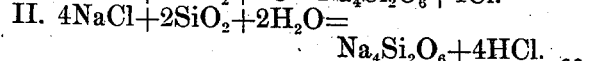

The said decomposition of the salt occurs quickly and easily at a bright red heat; at a dark red heat, however, it is very incomplete and gradual. Now, since for the purpose of losing as little silver as possible, it is an essential condition of chloridizing roasting that the temperature should be as low as possible, a further addition must be made which will induce the aforesaid reactions and carry them to completion at a quite dark red heat. Such an addition is pyrites, or sulfur and metal oxids, or sulfids in general which are capable of being roasted. These do not exclude the necessity for the presence of clay. On the contrary, the silica of the clay substance now liberated from the latter by the sulfuric acid produced during the roasting acts energetically on the salt and liberates the hydrochloric acid of chlorin required for the chloridizing roasting essentially more easily than when there is no addition of pyrites. The addition of pyrites, however, must be made not only with respect to the object of decomposing the salt for chloridizing the sulfur, but with respect to the content of cobalt, nickel and lime in the ore. During the roasting of the ore the cobalt and nickel must be brought into a form of combination, such that these metals can be dissolved completely or at least in greater part by the dilute acid produced by absorption of the gases from the roasting furnace in the usual absorption towers. This form is the basic sulfate as it is obtained by roasting the aforesaid mixture of ore, common salt, pyrites and clay. Since the sulfates of nickel and cobalt begin to decompose into oxids at 600° C. it is necessary when these metals are to be won, not to exceed a temperature of about 580° C., that is a dark red heat.

If a cherry red heat of about 750° C. were used during the roasting, at which temperature the chloridizing of the silver would be complete even without the aid of pyrites, extraction of the cobalt and nickel from the roasted ore by the weak tower acid would be impossible. On the other hand a temperature of 580° C. is sufficient to decompose again completely the ferrous sulfate formed between 400° and 450° C., while the ferrous sulfate formed acts as an oxygen carrier very favorably on the sulfatizing of the cobalt and nickel and also on the conversion of the arsenic to sodium arsenate. The addition of pyrites has, however, a further very important function, namely to convert the calcium carbonate into a form in which it is practically insoluble in dilute hydrochloric acid, that is to say into calcium sulfate; this change being produced by double decomposition with the sodium sulfate formed during the roasting from the common salt, the calcium being transiently present as calcium chlorid in the mass being roasted. The following equations represent these changes:

I. $NaCl + 2SO_2 + 2H_2O + 2O = 4HCl + 2Na_2SO_4$

II. $2CaCO_3 + 4HCl = 2CaCl_2 + 2H_2O + 2CO_2$

III. $2CaCl_2 + 2Na_2SO_4 = 2CaSO_4 + 4NaCl$.

The sodium chlorid being reproduced, the decomposition begins again to continue so long as calcium carbonate and sulfur dioxid (from the pyrites) are present.

The simple final result of the several reactions which occur are as follows: All the silver, free and combined, is converted into chlorid; cobalt and nickel are in greater part present as basic sulfate; all lime is converted into sulfate. The greater part of the arsenic remains as sodium arsenate together with sodium sulfate in the roasted mass and is dissolved by the tower acids; another smaller part passes away as arsenious acids with the furnace acids and is caught in the absorption towers. The furnace gases contain hydrochloric and sulfuric acid besides a little chlorin; they are recovered in condensing towers of usual construction and are then used as tower acid for extracting the cobalt, nickel and arsenic. Since, however, by a single roasting only some 11-12 per cent. of silver can be extracted, the roasting must be repeated when ores which contain more than about 10 per cent. of silver are under treatment, so as to extract by stages an ever decreasing percentage of silver, until there is only a quite inconsiderable proportion left in the residue. We shall call this step by step procedure roasting in stages. It is also found that when such large proportions of chlorid of silver are formed in the ore a leaching operation must follow each roasting and further that it is better to dissolve first the cobalt, nickel and arsenic (the last as sodium arsenate) by means of the tower acid and then to extract the silver chlorid with sodium thiosulfate or ammonia; the dried residue from the leaching is mixed with a fresh quantity of salt, pyrites and clay and again roasted. From the foregoing results of my investigations I have developed a metallurgical treatment of the Canadian ores (for instance the silver ores of Ontario which contain cobalt, nickel and arsenic) which I select as typical examples of the complex ores in question, which treatment may be expressed as follows: The ore is suitably subdivided. For the sake of procuring satisfactory mixing the salt, pyrites and clay, which latter may in part at least be the dry residue from the leaching operations, are added before the pulverizing or like operation. The succeeding processes are as follows: Roasting of the mixture in mechanical roasters (these may be used in all the roastings) until no more gases are evolved at a dark red heat. Leaching with tower acid for extraction of cobalt, nickel and arsenic. Leaching with sodium thiosulfate or calcium thiosulfate or ammonia for extracting silver. The washed residue is dried and the roasting and leaching repeated until the small proportion of metal in the residue from the leaching renders further repetition unprofitable.

Instead of pure iron pyrites, poor sulfur ores in which the sulfur has hardly any value for other purposes may be used, and even ores of this kind which contain a more or less high content of copper. The copper sulfid is in this case roasted to copper chlorid and extracted by the tower acid. The combined leaching liquors containing the cobalt, nickel and arsenic, in the event of their containing copper derived from the ores or from the additions which have been made, are mixed in the cold with calcium sulfid or sodium sulfid, then separated from the precipitated copper sulfid, then treated with fresh ore containing calcium carbonate so as to neutralize the free acids present (this ore is afterward added to the mixture to be roasted) and then treated with calcium sulfid or sodium sulfid to precipitate the cobalt and nickel which are worked up in the usual manner. The remaining liquor which contains sodium arsenate as well as sodium sulfate is evaporated to crystallization for the purpose of either recovering the salts as such, or after further treatment with suitable substances. The combined silver liquors obtained from the several stages of the roasting are mixed with a solution of calcium sulfid or sodium sulfid in due proportion. The precipitated silver sulfid is worked up into metallic silver in the known manner and the regenerated liquor is returned to the process.

It is to be observed that for the clay used as an addition there may be substituted wholly or in part loam, or sand containing clay or marl. In the case of ores poor in silver, pure sand may be used instead of clay. It is also possible to substitute wholly or in part for the clay silicious minerals containing alumina and iron, for instance the so-called fullers' earth.

It is to be understood that wherever in the claims hereunto appended aluminium silicate and clay are mentioned these terms are to be held to include the substances named in the two next preceding paragraphs. As an example of the gradual extraction there may be given the results of two experiments, which I have performed by roasting in stages. In both series of experiments there were in all four roastings. In the first series only the silver was extracted with dilute ammonium, without respect to the extraction of nickel and cobalt; in the second series nickel, cobalt and arsenic were first extracted by means of acid water (5 volumes per cent. of concentrated hydrochloric acid and 5 volumes per cent. of concentrated sulfuric acid) and then the silver was extracted by means of a solution of sodium thiosulfate of 5 per cent. strength.

*Results of the first series of roasting in stages—Amount of silver extracted after the several roastings.*

| | | |
|---|---|---|
| I. Roasting | 11.34 per cent. | =67.54 per cent. of the total silver. |
| II. " | 5.38 per cent. | =32.06 per cent. of the total silver. |
| III. " | 0.052 per cent. | = 0.31 per cent. of the total silver. |
| IV. " | ...... | ..... |
| | 16.772 per cent. | =99.91 per cent. leaving in the residue |
| | 0.016 per cent. | = 0.09 per cent. |

*Results of the second series of roasting in stages—Silver, cobalt and nickel extracted after the several roastings.*

| | | | | |
|---|---|---|---|---|
| I. Roasting | 7.52% CO+Ni and | 12.64 Ag. | =75.85% | of the total silver. |
| II. " | 2.77% " | " and 3.10% | =18.603 | of the total silver. |
| III. " | 2.39% " | " and 0.72% | = 4.32% | of the total silver. |
| IV. " | 1.10% " | " and 0.156% | = 0.934% | of the total silver. |
| | 13.78% " | " and 16.616% | =99.707 | leaving in the residue |
| | 4.30% " | " and 0.048% | = 0.29. | |

In the preceding table the values left in the residue are calculated on the values in the original ore under treatment. In these experiments the residue contained 1.3 per cent. of arsenic so that about 95 per cent. of the total arsenic was recovered.

Now what I claim and desire to secure by Letters Patent is the following:

1. The process for treating silver bearing materials containing cobalt, nickel and arsenic, which consists in converting the silver, cobalt, nickel and arsenic into soluble compounds by roasting the ore at a suitable temperature with addition of an alkali chlorid and an aluminium silicate and then separating the said soluble compounds from the mass by suitable leaching agents, substantially as described.

2. The process for treating silver bearing materials containing cobalt, nickel and arsenic, which consists in converting the silver, cobalt, nickel and arsenic into soluble compounds by roasting the ore at a suitable temperature with addition of an alkali chlorid and an aluminium silicate and a metal sulfid, and then separating the said soluble compounds from the mass by suitable leaching agents, substantially as described.

3. The process for treating silver bearing materials containing cobalt, nickel and arsenic, which consists in converting the silver, cobalt, nickel and arsenic into soluble compounds by roasting the ore at a suitable temperature with addition of common salt, clay and pyrites, and then separating the said soluble compounds from the mass by suitable leaching agents, substantially as described.

4. The process for treating silver bearing materials containing cobalt, nickel and arsenic, which consists in converting the silver, cobalt, nickel and arsenic into soluble compounds by roasting the ore at a suitable temperature with addition of common salt, leached residues which contains clay, and pyrites, and then separating the said soluble compounds from the mass by suitable leaching agents, substantially as described.

In testimony, that I claim the foregoing as my invention, I have signed my name in presence of two witnesses, this 3rd day of February, 1913.

OSCAR DYCKERHOFF.

Witnesses:
 EVA SATTLER,
 HERMANN WEIL.